United States Patent
Okuyama

(10) Patent No.: US 7,258,445 B2
(45) Date of Patent: Aug. 21, 2007

(54) POLARIZATION SPLITTER, OPTICAL UNIT AND IMAGE PROJECTOR

(75) Inventor: Atsushi Okuyama, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 131 days.

(21) Appl. No.: 11/176,996

(22) Filed: Jul. 7, 2005

(65) Prior Publication Data

US 2006/0007540 A1    Jan. 12, 2006

(30) Foreign Application Priority Data

Jul. 8, 2004    (JP) ............................ 2004-202042

(51) Int. Cl.
  G03B 21/14    (2006.01)
  G03B 21/26    (2006.01)
  G02B 5/30     (2006.01)
  G02B 27/28    (2006.01)

(52) U.S. Cl. ................... 353/20; 353/30; 359/497; 359/496

(58) Field of Classification Search ................. 353/20, 353/30; 359/496, 497
See application file for complete search history.

(56) References Cited

U.S. PATENT DOCUMENTS

| | | | |
|---|---|---|---|
| 5,716,122 A | 2/1998 | Esaki et al. .................... 353/33 |
| 6,394,606 B1 * | 5/2002 | Miyawaki et al. ............. 353/20 |
| 6,464,360 B2 * | 10/2002 | Hattori et al. ................. 353/33 |
| 6,935,754 B2 * | 8/2005 | Salvatori et al. ............. 353/119 |
| 2003/0064879 A1 | 4/2003 | Ogino et al. .................. 601/75 |
| 2006/0028726 A1 * | 2/2006 | Ushigome .................... 359/500 |

FOREIGN PATENT DOCUMENTS

| | | |
|---|---|---|
| EP | 1 262 462 A1 | 12/2002 |
| JP | 2000/171770 | 6/2000 |
| JP | 2002-171770 | 6/2000 |

OTHER PUBLICATIONS

Patent Abstracts of Japan for Publication No. 2000/171770, Publication Date: Jun. 23, 2000.
European Patent Office Communication dated Oct. 20, 2005 for Application No. 05014463.
English Abstract for Japanese Patent Application JP 2000-171770.

* cited by examiner

Primary Examiner—Melissa Jan Koval
(74) Attorney, Agent, or Firm—Morgan & Finnegan, LLP

(57) ABSTRACT

A polarization splitter includes first and second glass members, and a polarization splitting layer and an adhesive layer arranged between the first and second glass members, wherein the polarization splitter satisfies $\alpha^2 \times E < 6000000$ and $K > 0.5$, where $\alpha$ is a coefficient of linear expansion of the first and second glass members ($10^{-7}$/K), $E$ is a Young's modulus of the first and second glass members ($10^8$ N/mm$^2$), and $K$ is a photoelastic constant of the first and second glass members (nm/mm·mm$^2$/N).

8 Claims, 10 Drawing Sheets

PRIOR ART

POLARIZATION SPLITTER, OPTICAL UNIT AND IMAGE PROJECTOR

BACKGROUND OF THE INVENTION

The present invention relates to a polarization splitter or polarization beam splitter ("PBS") suitable for an image projector, such as a liquid crystal projector.

In order to separate white light from a light source into plural colored lights and introduce each colored light to a corresponding image forming element, such as a liquid crystal panel, and to synthesize colored lights from plural image forming elements, the image projector uses the PBS that has transmission and reflection effects in accordance with a polarization state of the light.

The PBS includes a polarization splitting film or layer and an adhesive layer between two glass members. In order to reduce variance of the polarization state due to the birefringence caused by a stress generated in the glass material, the glass member is made of a glass material having a small photoelastic constant.

In general, the glass having a small photoelastic constant is expensive due to its limited applications. Accordingly, Japanese Patent Application, Publication No. 2000-171770 discloses a PBS including a glass member that satisfies the following equation:

$$5.00 \times 10^2 \geq K \cdot \alpha \cdot E \cdot \int (1-T) d\lambda \cdot \rho / Cp$$

where $K$ is a photoelastic constant of a glass material (nm/mm·mm$^2$/N), $\alpha$ is a coefficient of linear expansion of the glass material ($10^{-6}$/K), $E$ is a Young's modulus of the glass material ($10^3$ N/mM$^2$), $\lambda$ is a wavelength of the light (nm), $T$ is an internal transmittance of the glass material to the wavelength $\lambda$, $\rho$ is a specific gravity of the glass material (g/cm$^3$), $Cp$ is a specific heat of the glass material (J/g·k), and an integration range in the equation is a range of a light absorption waveband (between 420 and 500 nm).

However, the above condition is not practical, because an actual PBS uses a glass material having a photoelastic constant of nearly 0. This premises that the heat generated in the glass material is caused by the light absorption by the glass material itself.

The PBS has the glass member, the polarization splitting layer, and the adhesive layer. An optical path is long (such as 10 mm or greater) in the glass member whereas an optical path is short (such as 1 mm or smaller) in the polarization splitting layer and the adhesive layer. This results in a high heat density of the heat generated at the polarization splitting layer and the adhesive layer, consequently causing a large stress to be generated in the glass member. In addition, when the PBS projects a black image, so-called black enhancement (or light leakage) occurs.

BRIEF SUMMARY OF THE INVENTION

One of objects of the present invention is to reduce a stress generated in a glass member in a polarization splitter that has the glass member, the polarization splitting layer, and an adhesive layer.

A polarization splitter according to one aspect of the present invention includes first and second glass members, a polarization splitting layer and an adhesive layer arranged between the first and second glass members, wherein the polarization splitter satisfies $\alpha^2 \times E < 6000000$, and $K > 0.5$, where $\alpha$ is a coefficient of linear expansion of the first and second glass members ($10^{-7}$/K), $E$ is a Young's modulus of the first and second glass members ($10^8$ N/m$^2$), and $K$ is a photoelastic constant of the first and second glass members (nm/mm·mm$^2$/N).

An image projector according to one aspect of the present invention includes an optical unit. An image display system according to one aspect of the present invention includes an image projector, and an image information supply apparatus for supplying image information to an image projector.

Other objects and further features of the present invention will become readily apparent from the following description of the preferred embodiments with reference to accompanying drawings.

DETAILED DESCRIPTION OF THE PREFERRED EMBODIMENTS

Figure 1A:
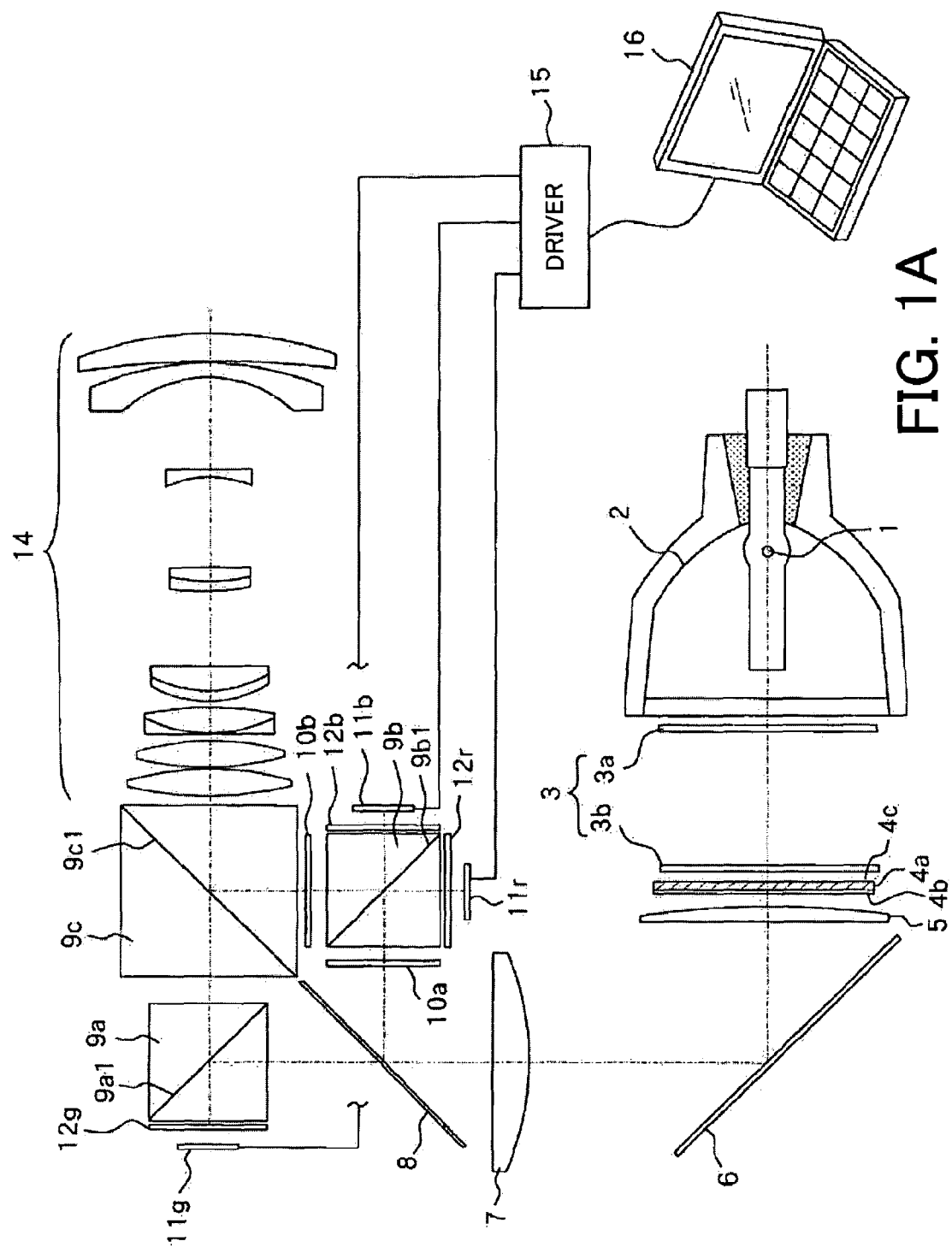
FIG. 1A is a view showing a structure of an image projector according to a first embodiment of the present invention.

Referring now to the drawings, a description will be given of a preferred embodiment of the present invention.

A description will now be given of a polarization beam splitter ("PBS") used for an optical unit in an image projector using conditional equations. The PBS in this embodiment is one that holds a polarization splitting layer made of a multilayer coating, and an adhesive layer made of a UV curing adhesive between first and second glass members. The image projector, separates illumination light from an illumination system that includes a light source into plural colored light components, such as red, green and blow, and introduces each component to a corresponding image forming element, such as a liquid crystal panel. In addition, the PBS synthesizes plural colored lights modulated by plural image forming elements, and introduces it to a projection lens.

The calorie generated in the polarization splitting layer varies according to the light intensity of the illumination system and the absorbency indexes of the polarization splitting layer and the adhesive layer. The polarization splitting layer and the adhesive layer generate the heats according to the absorbed light quantity and their temperature rises. The heats generated in the polarization splitting layer and the adhesive layer transmit to the glass member, and increases temperature of the glass member. As a result, the size and the coefficient of thermal expansion of the glass member cause the following deformation in the glass member:

Deformation amount (nm)=Temperature rise (K)×coefficient of thermal expansion (/K)×size (mm)

The thermal deformation of the glass member and a resultant stress generated in the glass member are expressed by the following equation:

Stress (N)=Deformation amount (mm²)×Young's modulus (N/mm²)

The phase difference of the light caused by the stress, i.e., the birefringence, is expressed by the following equation:

Phase difference=Stress (N)×Photoelastic coefficient (nm/N)

In summary, the following equation is obtained:

Phase difference={temperature rise (K)×coefficient of thermal expansion (/K)×size (m)}²×Young's modulus (N/mm²)×Photoelastic coefficient (nm/N)

Thereby, conceivable means of reducing a phase difference are 1) to reduce a photoelastic coefficient, 2) to reduce a temperature rise, and 3) to reduce a deformation of the glass.

The first scheme is not preferable because the usable glass member is limited as discussed in the "background of the invention" section. The second scheme requires a reduction of either the light intensity of the illumination system or the absorbency index of the polarization splitting layer, but the reduced light intensity is not preferable because the brightness of the projected image reduces. Therefore, a reduction of the absorbency index is preferable.

The third scheme requires a reduction of the term "coefficient of thermal expansion (/K)×size (m)²×Young's modulus (N/mm²). The size is removed from the parameter because it is determined by another factor, such as the size of the image forming element.

From the above, this embodiment satisfies the following conditions:

$$AT+AC<0.05(5\%) \quad (1)$$

$$\alpha^2 \times E < 6000000 \quad (2)$$

$$K>0.5 \quad (3)$$

where AT is an absorbency index of the polarization splitting layer formed on a surface of the glass member to the light having a wavelength of 430 nm, AC is an absorbency index of the adhesive layer that bonds the first glass member with the second glass member to the light having a wavelength of 430 nm, $\alpha$ ($10^{-7}$/K) is a coefficient of linear expansion of the first and second glass members, E ($10^8$ N/m²) is a Young's modulus of the first and second glass members, and K (nm/cm/ $10^5$ Pa). The coefficient of thermal expansion is a value at a room temperature (such as −30 to +70° C.).

Thereby, the calories generated in the polarization splitting layer and adhesive layer reduce, consequently reducing the stress generated in the glass material. Therefore, even when a relatively inexpensive glass material having a large photoelastic coefficient is used, the polarization disturbance is unlikely to occur in the PBS.

The absorbency index AT of the polarization splitting layer and the absorbency index AC of the adhesive layer preferably satisfy the following equation:

$$AT+AC<0.04(4\%) \quad (1)'$$

Thereby, the heat amount generated at the polarization splitting layer and the adhesive layer further reduces.

Regarding the photoelastic coefficient K, the glass material that satisfies K>1 is preferably selected. Thereby, a more general glass material may be used. A realistic upper limit value of the photoelastic coefficient K is K<3.

In order to improve the polarization splitting characteristic of the PBS, it is preferable to set n>1.65 where n is a refractive index of the glass material to the light having a wavelength of 587.56 nm.

Use of such a PBS for the image projector would improve the contrast of the projected image.

In particular, the power P of the light source of the image projector, the projected brightness B (ANSI lm (lumen)) and the diagonal size L (inch) of the image forming element preferably satisfy at least one of the following equations:

$$P/L^2 \geq 300 \quad (4)$$

$$B/L^2 \geq 3000 \quad (5)$$

These equations provide the high-quality projected image with less black enhancement and uneven colors when the light from a bright light source is incident upon a small image forming element or when a bright image is projected with a small image forming element.

The conditional equations are preferably replaced with the following equations:

$$P/L^2 \geq 400 \quad (4)'$$

$$B/L^2 \geq 4000 \quad (5)'$$

The realistic upper limit values of the equations (4), (4)', (5) and (5)' are as follows:

$$P/L^2 \leq 600 \quad (4)''$$

$$B/L^2 \leq 8000 \quad (5)''$$

First Embodiment

FIG. 1A shows a structure of an optical unit in an image projector according to a first embodiment of the present invention. In FIG. 1A, 1 denotes a light source made of a high-pressure mercury lamp, 2 denotes a reflector that radiates the light in a predetermined direction, and 3 denotes an integrator that forms an illuminated area having a uniform illumination light intensity. The integrator 3 includes fly-eye lenses 3a and 3b.

4 denotes a polarization converter that converts the non-polarized light into the polarized light in a predetermined direction, and includes a polarization splitting film 4a, a reflective film 4b, and a ½ phase plate 4c. 5 and 7 denote condenser lenses that condense the illumination light. 6 denotes a mirror. 8 denotes a dichroic mirror that transmits the light in a green waveband (green light) and reflects the lights in other wavebands.

9a, 9b and 9c denote PBSs having polarization splitting films 9a1, 9b1 and 9c1, respectively, each of which reflects the s-polarized light and transmits the p-polarized light.

10a and 10b denote color selective phase plates that convert or rotate the polarization direction of the light in a predetermined waveband by 90°. 11r, 11g and 11b denote reflective liquid crystal display ("LCD") devices or image forming elements, each of which reflects the incident light and forms an original image. 12r, 12g and 12b denote ¼ phase plates. 14 denotes a projection lens.

A driver 15 is connected to each LCD device, and makes each LCD display form an original image in each color based on an image signal from an image information supply apparatus 16, such as a personal computer ("PC"), a DVD player, a video player/recorder, and a TV tuner. Thereby, the illumination light incident upon each LCD device is modulated and turned to the image light. This is similar to but is not illustrated for other embodiments.

A description will now be given of an optical effect of the above structure. The light emitted from the light source 1 is condensed toward the fly-eye lens 3a. This light is split into plural lights by the fly-eye lens 3a. Plural lights are superimposed on the LCD devices 11r, 11g and 11b due to operations of the fly-eye lens 3b and condenser lenses 5 and 7. Thereby, an illumination area having a uniform illumination light intensity is formed on each of the LCD devices 11r, 11g and 11b.

The polarization splitting film 4a in the polarization converter 4 separates plural lights emitted from the fly-eye lens 3b into p-polarized light and s-polarized light for each light. The ½ phase plate 4c converts the p-polarized light into a polarization component in the same direction as the s-polarized light, and the reflective film 4b reflects the s-polarized light. Thereby, the polarization converter 4 emits plural lights from the fly-eye lens 3b in the same direction, as the lights having a predetermined polarization direction from.

Among the lights that are converted into almost the s-polarized light by the polarization converter 4, the green light transmits through the dichroic mirror 8, and the lights in the red and blue waveband (or the red and blue lights) are reflected by the dichroic mirror 8. The green light that transmits through the dichroic mirror 8 is incident upon the PBS 9a and reflected on the polarization splitting film 9a1, transmits through the ¼ phase plate 12g, and is incident upon the LCD device 11g.

Among the red and blue lights reflected on the dichroic mirror 8, a polarization direction of only the blue light is converted by 90° into the p-polarized light by the first color selective phase plate 10a and incident upon the PBS 9b, and the red light is incident as the s-polarized light upon the PBS 9b.

Figure 2:
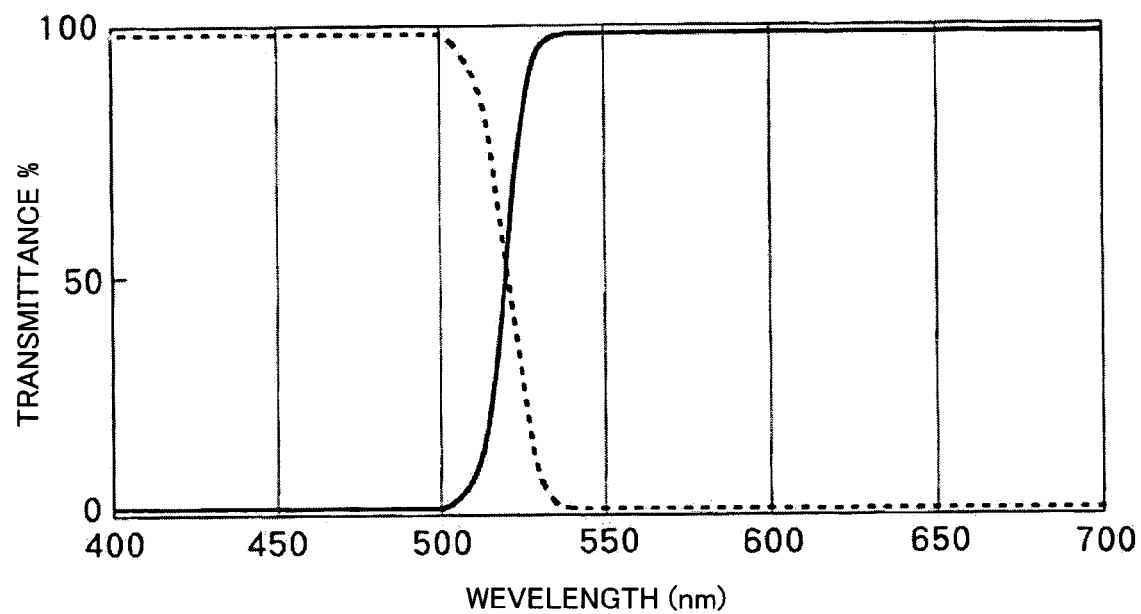
FIG. 2 is a view showing a characteristic of a first color selective phase plate used for the image projector according to the first embodiment.

FIG. 2 shows a characteristic of the first color selective phase plate 10a, where a broken line indicates the transmittance of the light in the polarization direction orthogonal to the incident polarization direction, and a solid line indicates the transmittance of the light having a polarization direction parallel to the incident polarization direction. The polarization splitting film 9b1 in the PBS 9b transmits the blue, p-polarized light, and reflects the red, s-polarized light. Thereby, the red light and the blue light having orthogonal polarization directions are separated.

The red light reflected on the polarization splitting film 9b1 in the PBS 9b transmits through the ¼ phase plate 12r, and is incident upon the LCD device 11r. The blue light that transmits through the polarization splitting film 9b1 in the PBS 9b transmits through the ¼ phase plate 12b, and is incident upon the LCD device 11b.

The green light that is modulated and reflected by the LCD device 11g transmits through the ¼ phase plate 12g, becomes the p-polarized light, and transmits through the polarization splitting films 9a1 and 9c1 in the PBSs 9a and 9c.

The red light that is modulated and reflected by the LCD device 11r transmits through the ¼ phase plate 12r, becomes the p-polarized light, transmits through the polarization splitting films 9b1 in the PBS 9b, and is incident upon the second color selective phase plate 10b.

Figure 3:
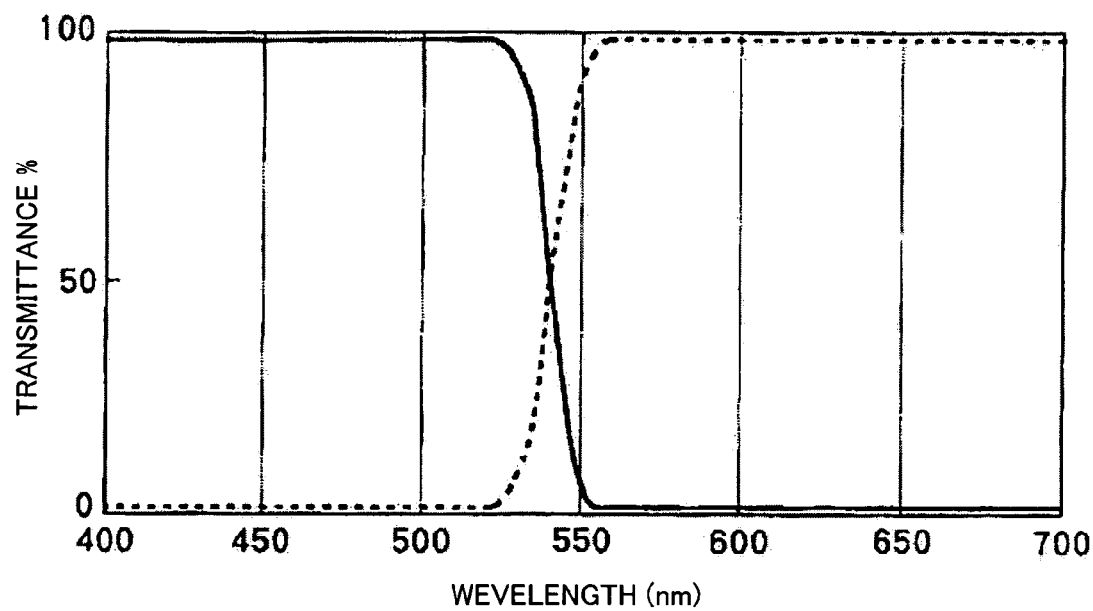
FIG. 3 is a view showing a characteristic of a second color selective phase plate used for the image projector according to the first embodiment.

FIG. 3 shows a characteristic of the second color selective phase plate 10b, where a broken line indicates the transmittance of the light in the polarization direction orthogonal to the incident polarization direction, and a solid line indicates the transmittance of the light having a polarization direction parallel to the incident polarization direction.

The blue light that is modulated and reflected by the LCD device 11b transmits through the ¼ phase plate 12b, becomes the s-polarized light, is incident upon the PBS 9b and reflected on the polarization splitting film 9ba, and enters the second color selective phase plate 10b.

The second color selective phase plate 10b converts the polarization directions of the red light and blue light incident upon the second color selective phase plate 10b by 90° into the s-polarized lights. The blue light is incident as the s-polarized light upon the polarization beam splitter 9c and reflected on the polarization splitting film 9c1. The polarization splitting film 9c1 in the PBS 9c synthesizes the red, green and blue lights. The composite light is introduced to the projection lens 14, and projected on a screen (not shown).

Figure 1B:
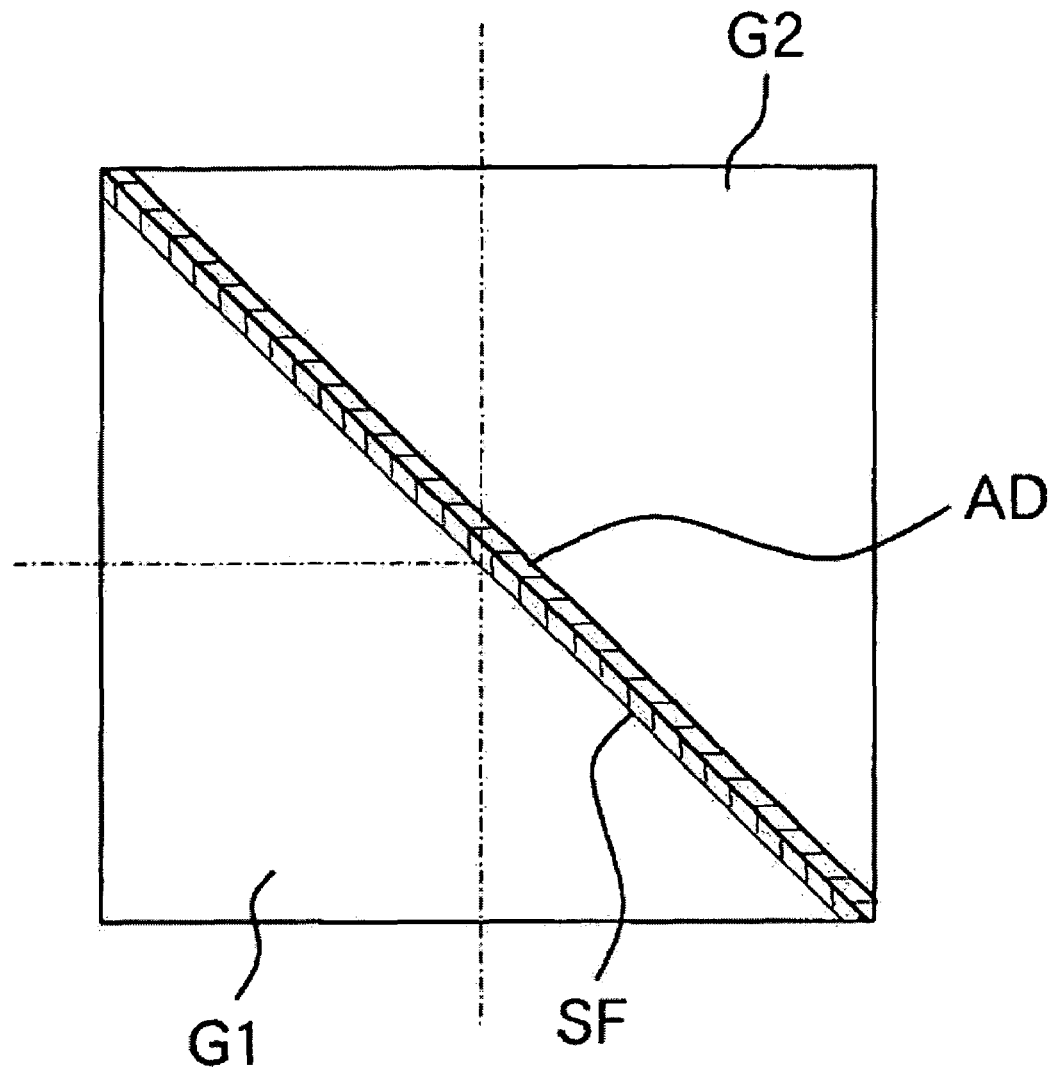
FIG. 1B is a schematic view of a structure of a polarization beam splitter used for the image projector according to the first embodiment.

FIG. 1B shows a structure of the PBS used for this embodiment. The PBS includes triangular first and second glass members G1 and G2, a polarization splitting film or layer SF that includes a multilayer coating formed on a surface of the first glass member G1, and an adhesive agent or layer AD that bonds the second glass member G2 with a surface of the first glass member G1, on which the polarization splitting film SF is formed.

For example, the incident light having a predetermined wavelength from the first glass member G1 is reflected on the polarization splitting film SF, and other wavelength transmits through the polarization splitting film SF and the adhesive layer AD. This structure of the PBS is common to other embodiments.

In this embodiment, the glass members used for the PBSs 9a and 9B have following specifications:

$$n=1.678, \alpha=72, E=910$$

$$\alpha^2 \times E = 4717440 < 6000000$$

The photoelastic coefficient of the glass member satisfies K=1.61>0.5.

In this embodiment, the light source has power P of 200 W, and the LCD device has a diagonal size or length L of 0.7 inches, the projected brightness B is 2000 ANSI, satisfying the conditional equations (4) and (5).

Figure 4:
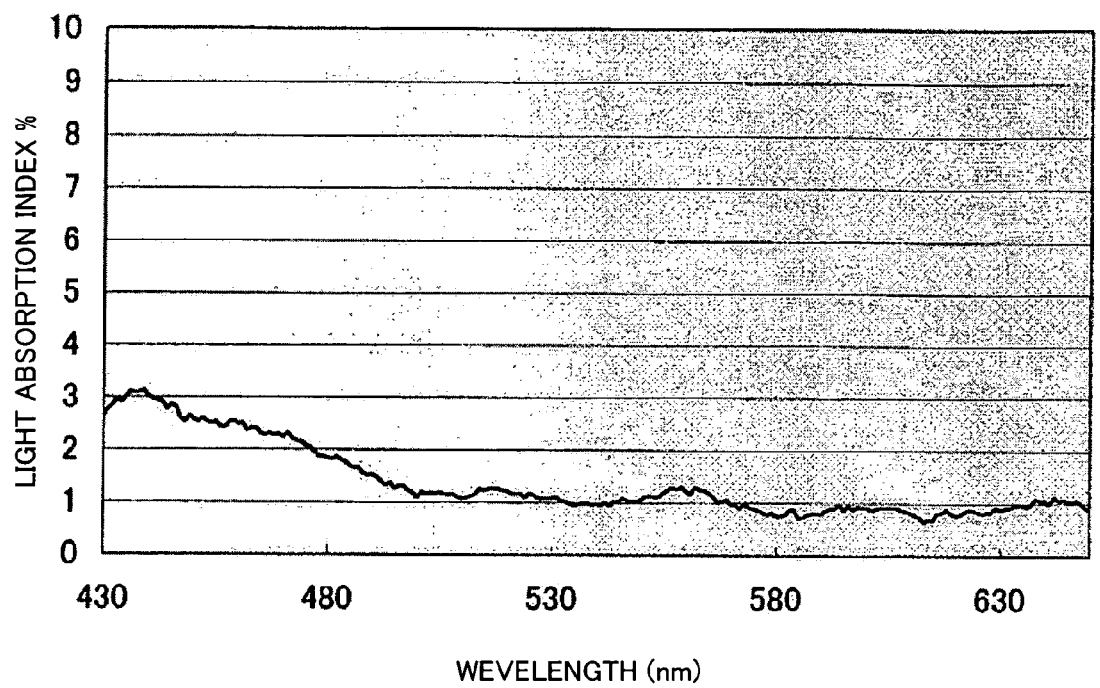
FIG. 4 is a view showing the absorbency indexes of the polarization splitting layer and adhesive layer in the polarization beam splitter used for the image projector according to the first embodiment.
Figure 5:
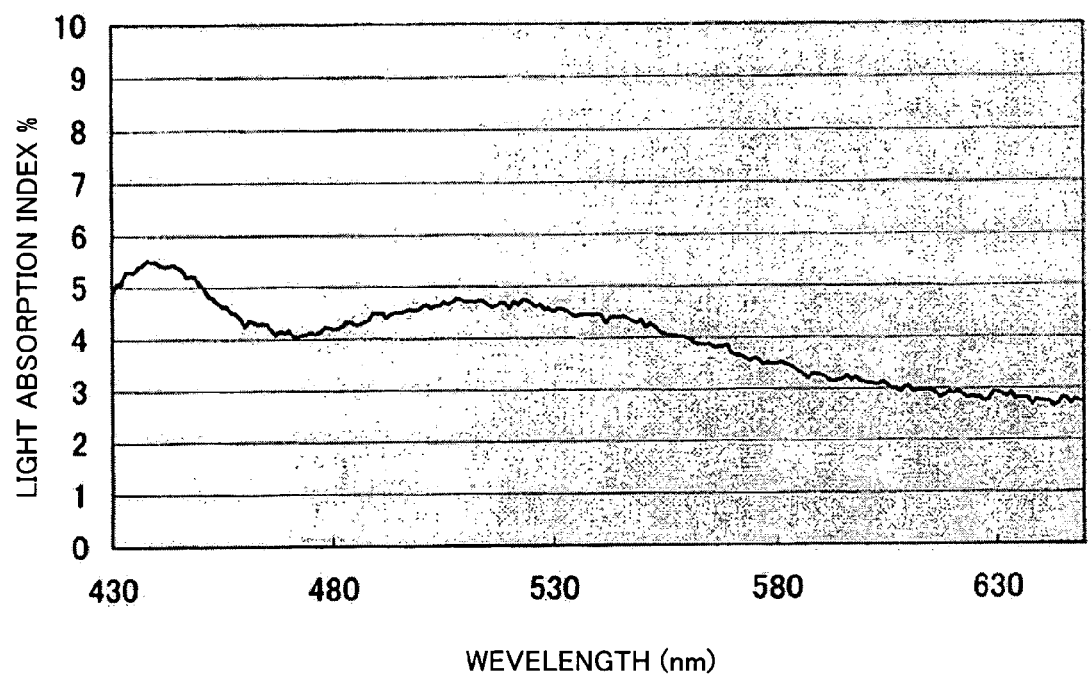
FIG. 5 is a view showing the absorbency indexes of the polarization splitting layer and adhesive layer in a conventional polarization beam splitter.

In this case, when the following absorbency indexes of the polarization separation layer and adhesive layer to the light having a wavelength of 430 nm satisfy AT+AC<0.05 as shown in FIG. 4, an experiment exhibits that no polarization disturbance occurs. On the other hand, when the following absorbency indexes of the polarization separation layer and the adhesive layer to the light having a wavelength of 430 nm satisfy AT+AC>0.05 as shown in FIG. 5, an experiment exhibits that the polarization disturbance occurs.

Second Embodiment

Figure 6:
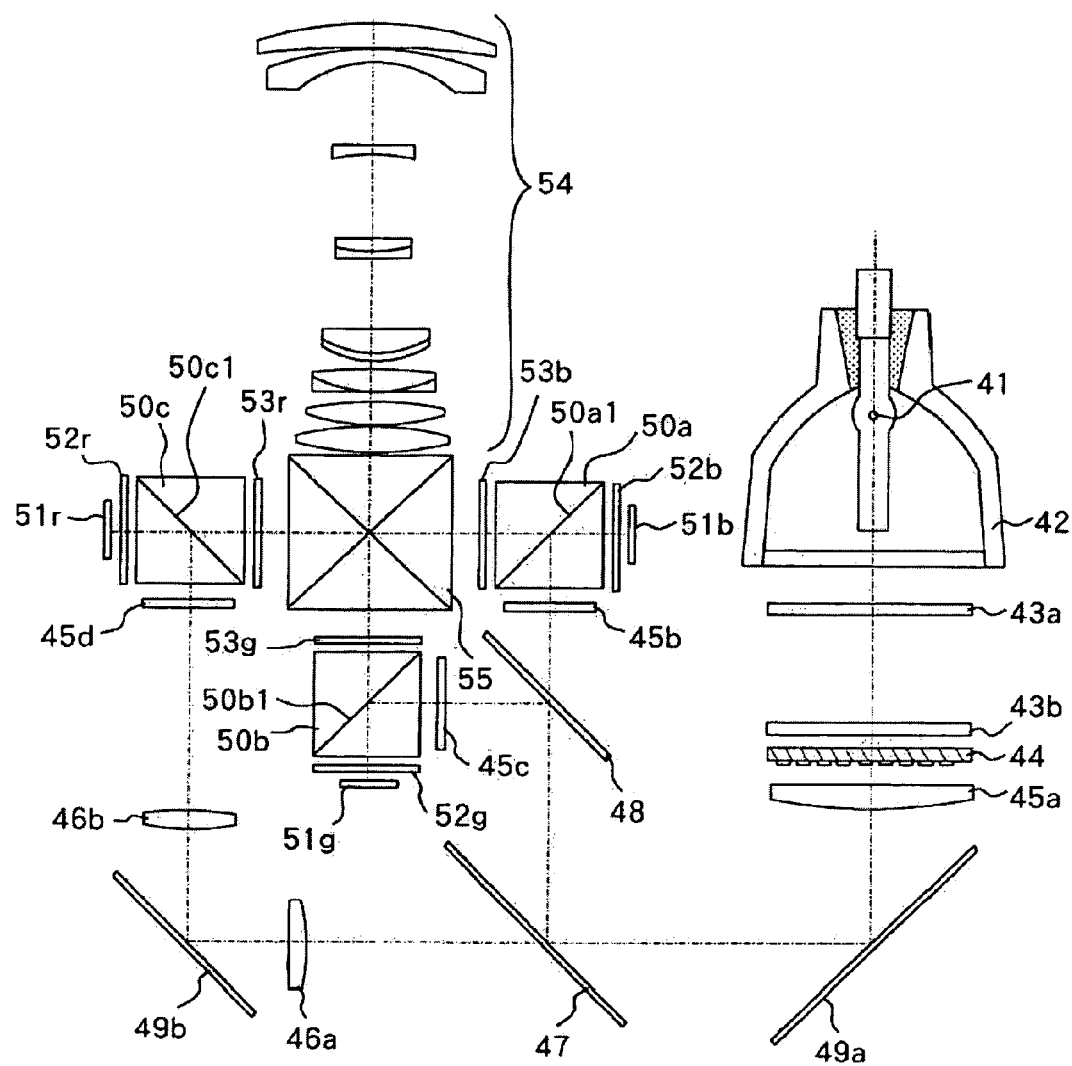
FIG. 6 is a view showing a structure of an image projector according to a second embodiment of the present invention.

FIG. 6 shows a structure of an optical unit in an image projector according to a second embodiment of the present invention. In FIG. 6, 41 denotes a light source that emits white light having a continuous spectrum, and 42 denotes a reflector that condenses the light from the light source 41 in a predetermined direction. 43a denotes a first fly-eye lens that arranges rectangular lenses in a matrix, and 43*b* denotes a second fly-eye lens that arranges respective lenses in a matrix.

44 denotes a polarization converter that converts the non-polarized light into a predetermined polarization direction. 45*a* denotes a condenser lens, and 45*b*, 45*c* and 45*d* denote field lenses. 46*a* and 46*b* denote relay lenses that transmit the illumination light without loss through a long optical path.

47 denotes a first dichroic mirror that transmits the light in the red (R) waveband (red light) and reflects the lights in the blue (B) and green wavebands (blue and green lights). 48 denotes a second dichroic mirror that transmits the blue light and reflects the green light.

49*a* and 49*b* denote mirrors. 50*a*, 50*b* and 50*c* denote first, second and third PBSs that include polarization splitting films 50*a*1, 50*b*1 and 50*c*1, respectively, for transmitting the p-polarized light and reflecting the s-polarized light.

51*r*, 51*g* and 51*b* denote reflective LCD devices for red, green and blue lights, respectively, for forming an original image and reflects the light.

52*r*, 52*g* and 52*b* denote ¼ wave plates for red, green and blue lights, respectively. 53*r*, 53*g* and 53*b* denote polarizing plates, each of which transmits a predetermined polarized light. 55 denotes a dichroic prism, and 54 denotes a projection lens.

Similar to the first embodiment, the lights that have been converted into almost the s-polarized light by the polarization converter 44 enter the first dichroic mirror 47. The red light transmits through the first dichroic mirror 47, and the green and blue lights are reflected on the first dichroic mirror 47. The red light that transmits through the dichroic mirror 47 is incident upon the PBS 50*c* via the relay lenses 46*a* and 46*b* and the field lens 45*d*, is reflected on the polarization splitting film 50*c*1, transmits through the ¼ phase plate 52*r*, and is incident upon the LCD device 51*r*.

Among the green and blue lights reflected on the first dichroic mirror 47, the green light is reflected on the second dichroic mirror 48 and the blue light transmits through the second dichroic mirror 48.

The green light reflected on the dichroic mirror 48 is incident upon the PBS 50*b* via the field lens 45*c*, is reflected on the polarization splitting film 50*b*1, transmits through the ¼ phase plate 52*g*, and is incident upon the LCD device 51*g*.

The blue light that transmits through the second dichroic mirror 48 is incident upon the PBS 50*a* via the field lens 45*b*, is reflected on the polarization film 50*a*1, transmits through the ¼ phase plate 52*b*, and is incident upon the LCD device 51*b*.

The green light that is modulated and reflected by the LCD device 51*g* transmits through the ¼ phase plate 52*g*, becomes the p-polarized light, and transmits through the polarization splitting film 50*b*1 in the PBS 50*b*.

The red light that is modulated and reflected by the LCD device 51*r* transmits through the ¼ phase plate 52*r*, becomes the p-polarized light, and transmits through the polarization splitting films 50*c*1 in the PBS 50*c*.

The blue light that is modulated and reflected by the LCD device 51*b* transmits through the ¼ phase plate 52*b*, becomes the p-polarized light, and transmits through the polarization splitting films 50*a*1 in the PBS 50*a*.

The dichroic prism 55 synthesizes the red, green and blue lights that have transmitted corresponding PBSs, and the composite light is introduced to the projection lens 54 and projected on a screen (not shown).

In this embodiment, the glass members used for the PBSs 9*a* and 9B have following specifications:

$n=1.697$, $\alpha=57$, $E=1118$ $\alpha^2 \times E = 3632382 < 6000000$

The photoelastic coefficient of the glass member satisfies $K=1.86 > 0.5$.

In this embodiment, the light source has power P of 230 W, and the LCD device has a diagonal size or length L of 0.7 inches, the projected brightness B is 2500 ANSI, satisfying the conditional equations (4) and (5).

Regarding the absorbency indexes of the polarization separation layer and the adhesive layer to the light having a wavelength of 430 nm, this embodiment provides similar results to that of the first embodiment.

Third Embodiment

Figure 7:
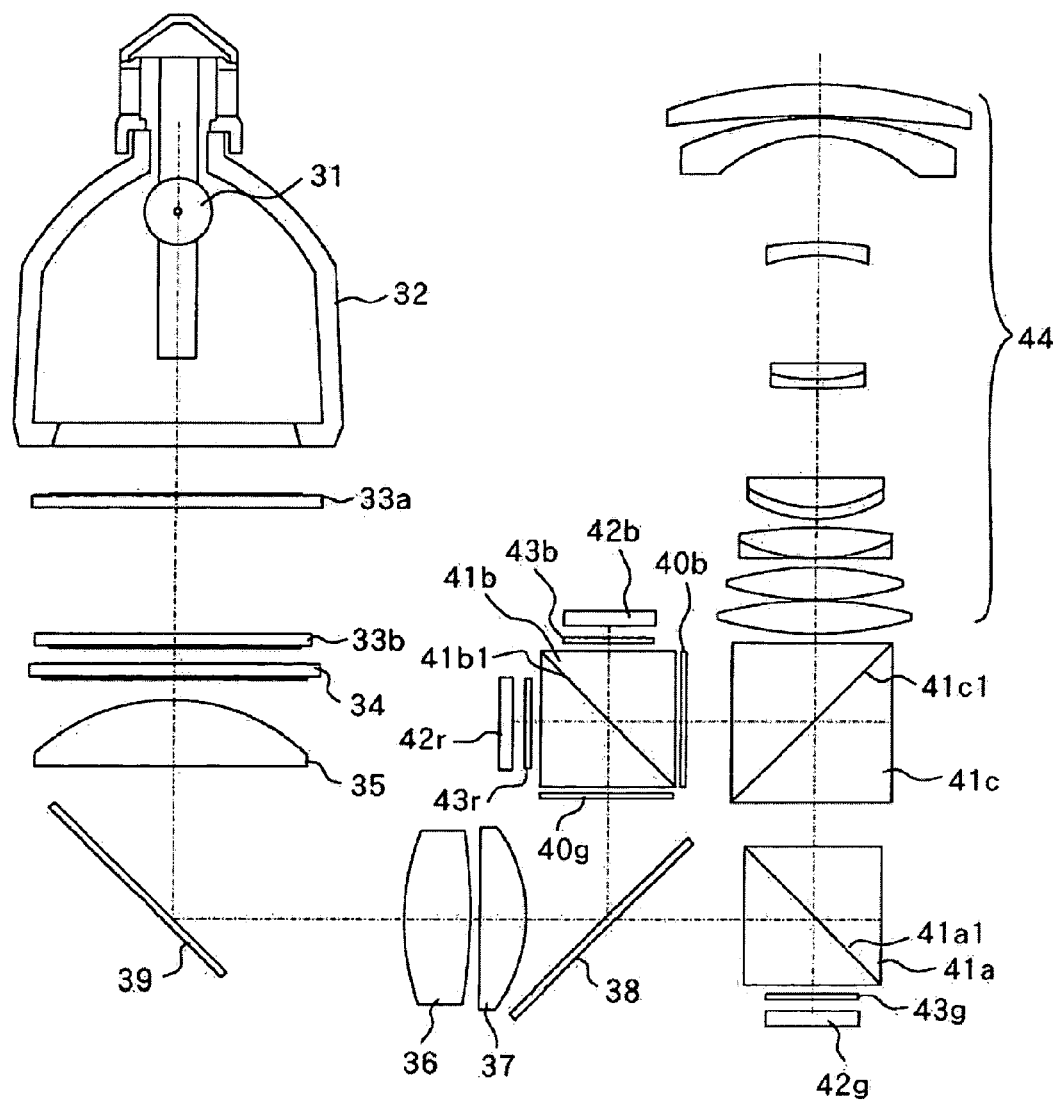
FIG. 7 is a view showing a structure of an image projector according to a third embodiment of the present invention.

FIG. 7 shows a structure of an optical unit in an image projector according to a third embodiment of the present invention. In FIG. 7, 31 denotes a light source made of a high-pressure mercury lamp, and 32 denotes a reflector. 33*a* denotes a first lens array including plural cylindrical lenses, and 33*b* denotes a second lens array including plural cylindrical lenses.

34 denotes a polarization converter, and 35 denotes a first light compression lens. 36 denotes a condenser lens, and 37 denotes a second light compression lens. 38 denotes a dichroic mirror, 39 denotes a mirror, and 40*a* and 40*b* denote color selective phase plates. 41*a*, 41*b* and 41*c* denote PBSs having polarization splitting films 41*a*1, 41*b*1 and 41*c*1, respectively. 42*r*, 42*g* and 42*b* denote reflective LCD devices, respectively. 43*r*, 43*g* and 43*b* denote ¼ phase plates, and 44 denotes a projection lens.

The operation of the color separation/synthesis system in this embodiment from the dichroic mirror 38 to the projection lens 44 is similar to that of the first embodiment.

Figure 8:
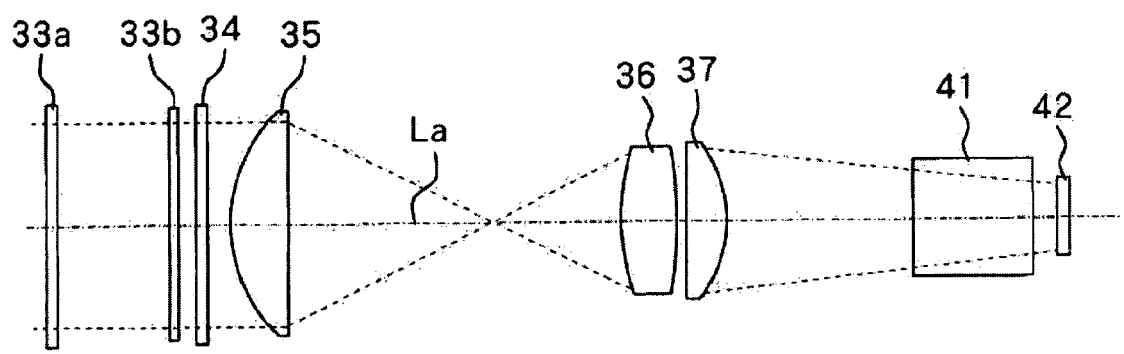
FIG. 8 is an exploded view of the image projector according to a third embodiment of the present invention.
Figure 9:
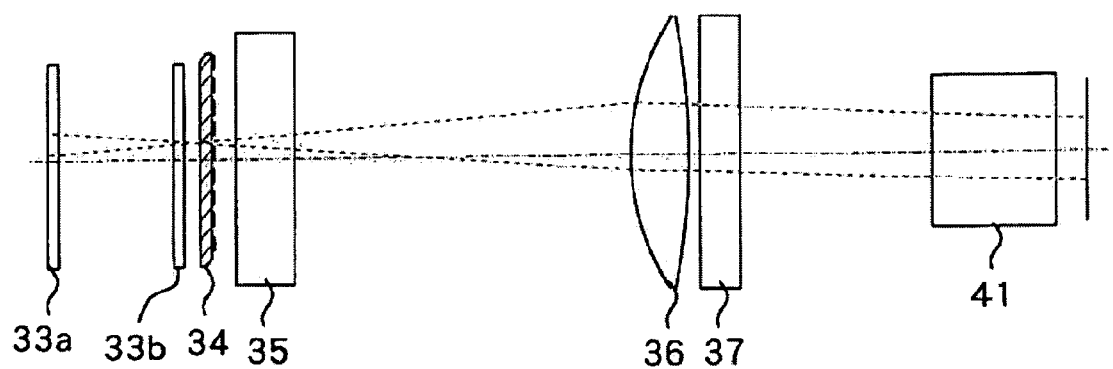
FIG. 9 is an exploded view of the image projector according to a third embodiment of the present invention.

FIG. 8 shows a section that linearly explodes the illumination optical system from the first lens array 33*a* in FIG. 7 to each reflective LCD device. FIG. 9 shows a section that linearly explodes the illumination optical system from the first lens array 33*a* in FIG. 7 to each reflective LCD device, in a direction perpendicular to the paper surface that contains the optical axis La in FIG. 8.

In FIGS. 7 to 9, the first and second lens arrays 33*a* and 33*b* arrange plural cylindrical lenses in a paper surface direction in FIG. 9.

The first and second light compression lenses 35 and 37 include a cylindrical lens having a refractive power only in a paper surface direction of FIG. 8. Due to the operations of the first and second light compression lenses 35 and 37 and the condenser lens 36, the light from the light source 31 is condensed upon the reflective LCD device in the paper surface direction of FIG. 7, while its sectional shape accords with a shape of the illuminated surface of the LCD device (or the image forming area).

In the section that contains the arrangement direction of each cylindrical lens in the first lens array 33*a* in FIG. 9, the light from the light source 31 is incident upon the first lens array 33*a*, condensed by the first lens array 33*a*, and incident upon the second lens array 33*b*. The light forms plural secondary light source images on or near an exit surface of the second lens array 33*b*.

The condenser lens 36 superimposes and irradiates the lights from plural secondary light source images on the reflective LCD devices, after the polarization converter 34 converts the polarization directions of the lights from them, into a predetermined polarization direction.

In this embodiment, the glass members used for the PBSs 9*a* and 9B have following specifications:

$n=1.717$, $\alpha=80$, $E=868$ $\alpha^2 \times E = 5555200 < 6000000$

The photoelastic coefficient of the glass member satisfies $K=1.51 > 0.5$.

In this embodiment, the light source has power P of 150 W, and the LCD device has a diagonal size or length L of 0.55 inches, the projected brightness B is 1200 ANSI, satisfying the conditional equations (4) and (5).

Regarding the absorbency indexes of the polarization separation layer and the adhesive layer to the light having a wavelength of 430 nm, this embodiment provides similar results to that of the first embodiment.

As described above, the above embodiment can reduce the heat generated at the polarization splitting layer and the adhesive layer, and consequently reduce the stress generated in the glass member. Thus, even when the glass member having a large photoelastic coefficient is used, the polarization disturbance can be reduced in the polarization splitting element.

Such a polarization splitter can provide a high-quality projection image with less black enhancement and uneven colors.

The inventive polarization splitter or PBS is not limited to the image projectors structured in the above embodiments, and is applicable to any structured image projectors that uses a polarization splitter that introduces the light from a light source to an image forming element utilizing the polarization characteristic, or to a projection lens utilizing the light modulated by the image forming element.

While each of the above embodiments describes an image projector that uses a reflective image forming element, the inventive polarization splitter is applicable to an image projector that uses a transmitting image forming element, a self-luminous image forming element or electroluminescence, a micro mirror array, and other image forming elements.

This application claims a foreign priority benefit based on Japanese Patent Applications No. 2004-202042, filed on Jul. 8, 2004, which is hereby incorporated by reference herein in its entirety as if fully set forth herein.

What is claimed is:

1. An optical unit comprising:
    a light source;
    a polarization splitter;
    an image forming element for forming an original image; and
    a projection lens for projecting light emitted from the light source via said polarization splitter and said image forming element,
    wherein said polarization splitter comprises:
       a first glass member;
       a second glass member; and
       a polarization splitting layer and an adhesive layer arranged between said first and second glass members,
    wherein the polarization splitter satisfies:
       $\alpha^2 \times E < 6000000$; and
       $K > 0.5$,
       where $\alpha$ is a coefficient of linear expansion of the first and second glass members ($10^{-7}$/K), E is a Young's modulus of the first and second glass members ($10^8$ N/m$^2$), and K is a photoelastic constant of the first and second glass members (nm/mm·mm$^2$/N).

2. An optical unit according to claim 1, wherein AT+AC<0.05 is met where AT is an absorbency index of the polarization splitting layer to light having a wavelength of 430 nm, and AC is an absorbency index of the adhesive layer to light having a wavelength of 430 nm.

3. An optical unit according to claim 1, wherein K>1 is met.

4. An optical unit according to claim 1, wherein n>1.65 is met, where n is a refractive index of the first and second glass members to the light having a wavelength of 587.56 nm.

5. An optical unit according to claim 1, wherein P/L$^2 \geq$300, where P is a power value (W) of the light source, and L is a diagonal size of said image forming element (inch).

6. An optical unit according to claim 1, wherein B/L$^2$3000, where B is a projection brightness (ANSIlm), and L is a diagonal size of said image forming element (inch).

7. An image projector comprising an optical unit that includes:
    a light source;
    a polarization splitter;
    an image forming element for forming an original image; and
    a projection lens for projecting light via said polarization splitter and said image forming element,
    wherein said polarization splitter comprises:
       a first glass member;
       a second glass member; and
       a polarization splitting layer and an adhesive layer arranged between said first and second glass members,
    wherein the polarization splitter satisfies;
       $\alpha^2 \times E < 6000000$; and
       $K > 0.5$,
       Where $\alpha$ is a coefficient of linear expansion of the first and second glass members ($10^{-7}$/K), E is a Young's modulus of the first and second glass members ($10^8$ N/m$^2$), and K is a photoelastic constant of the first and second glass members (nm/mm·mm$^2$/N).

8. An image display system comprising:
    an image projector; and
    an image information supply apparatus for supplying image information to an image projector,
    wherein said image projector includes an optical unit that includes:
       a light source;
       a polarization splitter;
       an image forming element for forming an original image; and
       a projection lens for projecting light via said polarization splitter and said image forming element,
    wherein said polarization splitter comprises:
       a first glass member;
       a second glass member; and
       a polarization splitting layer and an adhesive layer arranged between said first and second glass members,
    wherein the polarization splitter satisfies:
       $\alpha^2 \times E < 6000000$; and
       $K > 0.5$,
       Where $\alpha$ is a coefficient of linear expansion of the first and second glass members ($10^{-7}$/K), E is a Young's modulus of the first and second glass members ($10^8$ N/m$^2$), and K is a photoelastic constant of the first and second glass members (nm/mm·mm$^2$/N).

* * * * *